United States Patent [19]

Momont

[11] Patent Number: 5,070,817
[45] Date of Patent: Dec. 10, 1991

[54] CONICAL DOME VALVE

[75] Inventor: Timothy W. Momont, Kendallville, Ind.

[73] Assignee: CTB, Inc., Milford, Ind.

[21] Appl. No.: 514,619

[22] Filed: Apr. 26, 1990

[51] Int. Cl.$^5$ .............................................. A01K 7/00
[52] U.S. Cl. ..................................................... 119/75
[58] Field of Search ....................... 119/74, 75, 78, 79, 119/80; 251/146, 339

[56] References Cited

U.S. PATENT DOCUMENTS

| 2,662,503 | 12/1953 | Johnson | 119/80 |
| 3,505,978 | 4/1970 | Nilsen | 119/75 |
| 3,648,663 | 3/1972 | Kofford | 119/75 |
| 3,868,926 | 3/1975 | Olde | 119/75 |
| 3,941,094 | 3/1976 | Nilsen, Jr. | 119/80 |
| 4,282,831 | 8/1981 | Nilsen | 119/75 |
| 4,307,682 | 12/1981 | Bollman | 119/75 |
| 4,416,221 | 11/1983 | Novey | 119/75 X |
| 4,779,571 | 10/1988 | Row | 119/75 |

FOREIGN PATENT DOCUMENTS

| 335322 | 9/1930 | United Kingdom | 119/75 |
| 2091076 | 7/1982 | United Kingdom | 119/75 |

Primary Examiner—Gene Mancene
Assistant Examiner—R. Thomas Price
Attorney, Agent, or Firm—Trexler, Bushnell, Giangiorgi & Blackstone, Ltd.

[57] ABSTRACT

A watering assembly for controllably dispensing water from a supply source into a drinking cup mounted on an animal watering apparatus and formed to prevent the accumulation of particulate matter on the top of the valve and induce and enhance agitating flow patterns created by water being discharged from the watering assembly. The watering assembly has a valve which is at least partially disposed within the cup and has a regulating portion which is activated by an animal forceably contacting the valve. Once activated, water flows from the valve and is directed downwardly into the cup by a deflector member whereupon the water flows over a flow directing portion of the valve which enhances the agitating flow patterns to thoroughly mix the water with any sedimentation which may have accumulated in the cup. Enhanced flow patterns created by the flow directing portion of the valve thoroughly mix the water in the cup preventing sedimentation build-up in blind areas or still areas. The flow directing portion is formed on an upper portion of the valve which is disposed within a container and has a generally conical shaped dome thus preventing particulate matter from accumulating on the upper portion of the valve. Generally, greatest agitation is achieved by forming a generally concave conical dome.

9 Claims, 2 Drawing Sheets

CONICAL DOME VALVE

BACKGROUND OF THE INVENTION

This invention relates generally to the valve arts and more particularly to valves used in animal watering apparatus.

Apparatus used to automatically water animals such as foul and livestock have dramatically reduced the time, man power and cost expended in providing animals with necessary quantities of water. Such automatic watering apparatus also permit watering of animals with greater consistency as well as the ability to introduce nutrients and medication through such a watering system. With regard to these automatic watering systems, the benefits are obviously manyfold.

Automatic animal watering systems are not without problems. A considerable problem is to maintain the water dispensed into drinking cups in a sufficiently sanitary condition. Sanitation problems arise from feed and other particulate matter falling into the drinking cups. If the cups are not cleaned regularly, sedimentation comprised of feed and other particulate matter tends to build up in the bottom of the drinking cup potentially fouling the automatic valve mechanism located therein. If a valve becomes fouled, fresh water is not permitted to flow and the water may become contaminated. Also, the number of drinking containers available is reduced thereby increasing competition among the animals for the remaining drinking cups.

In response to these problems, valves were created having regulating devices which were activated by the animals and permitted only positive flow of water out through the valve. Positive water flow through the valve is assured by a check valve device prohibiting back flow into a source manifold to which the valve is attached. A deflecting member is positioned above a discharge port of the valve to deflect water downwardly into the cup to mix the water in the cup with the accumulated sedimentation. Examples of patents which show valves similar to these described above include U.S. Pat. No. 3,505,978 to Nilsen and U.S. Pat. No. 4,282,831 to Nilsen.

While the above-referenced valves reduce the possibility of valve fouling and subsequent sanitation problems other problems have developed. An advantage of the combination of the valve positioned in a container is to create flow patterns in the container, using the natural positive flow of water out of the valve, to mix the water and the sedimentation in the container. Upon mixing, the sedimentation was at least temporarily suspended in water and animals drinking the water would consume the particulate matter thereby decreasing the sedimentation which might build up in the cup and reducing the need to manually clean each cup. However, the valves as shown in the patents referenced above still had some degree of fouling since a top portion of the valve was flat and tended to accumulate sedimentation which, when fowl pecked at the valve, would lodge under the valve wedging the valve into the open position. Further, the valve in the cup formed blind spots out of reach and unaffected by the agitating forces of the discharging water, adding to the sedimentation build up in the cup. This sedimentation build up required periodic manual cleaning to prevent unsanitary conditions from developing.

Up until now, these periodic cleanings have been accepted as a trade-off for the substantial benefits of the generally self-cleaning prior art valve apparatus. However, it has been discovered that a valve can be made to mount on the inside of a drinking cup which agitates the water in the blind spots as well as the rest of the drinking cup thereby preventing sedimentation build up and essentially eliminating the need for periodic manual cleanings.

OBJECTS AND SUMMARY OF THE INVENTION

A general object of the present invention is to provide a valve mounted in a drinking cup which is conical dome shaped to eliminate the build up of particulate matter on top of the valve for preventing such particulate matter from being wedged in the valve and forcing it into an open position.

Another object of the present invention is to provide a valve which is mounted in a drinking cup for use with an animal watering apparatus which creates agitating flow patterns in the water disposed within the cup to mix and at least temporarily suspend particulate matter in the water so that such particulate matter is removed when animals drink from the cup.

A more specific object of this invention is to provide a valve for use with an animal watering system which has a generally conical dome-shaped top which directs water downwardly into the bottom of the cup to enhance the agitating action of the flowing water.

Briefly, and in accordance with the foregoing, the present invention comprises a valve which automatically controllably dispenses water from a pressurized supply source into a drinking cup mounted on an animal watering apparatus. The valve is formed to prevent the accumulation of particulate matter on the top thereof and to enhance the agitating flow patterns created when water is discharged from the valve. The valve, being at least partially disposed within the container, has regulating means which are activated by an animal forceably contacting the valve. Once the valve is activated, water flows from the valve and is directed downwardly into the cup by a deflector member whereupon the water flows over a flow directing portion of the valve which enhances the agitating flow patterns to thoroughly mix the water with any sedimentation which may have accumulated in the cup. The enhanced flow patterns created by the flow directing portion of the valve thoroughly mixes the water in the cup to prevent sedimentation build up in blind areas or other still water areas which are inherent in prior art designs. The flow directing portion is formed on an upper portion of the valve which is disposed within a container and has a generally conical shaped dome thus preventing particulate matter from accumulating thereon. Generally, greatest agitation is achieved by forming a concave conical dome.

BRIEF DESCRIPTION OF THE DRAWINGS

The organization and manner of the operation of the invention, together with the further objects and advantages thereof, may best be understood by reference to the following description taken in connection with the accompanying drawings in which like reference numerals identify like elements and in which.

DETAILED DESCRIPTION OF THE ILLUSTRATED EMBODIMENT

Figure 1:
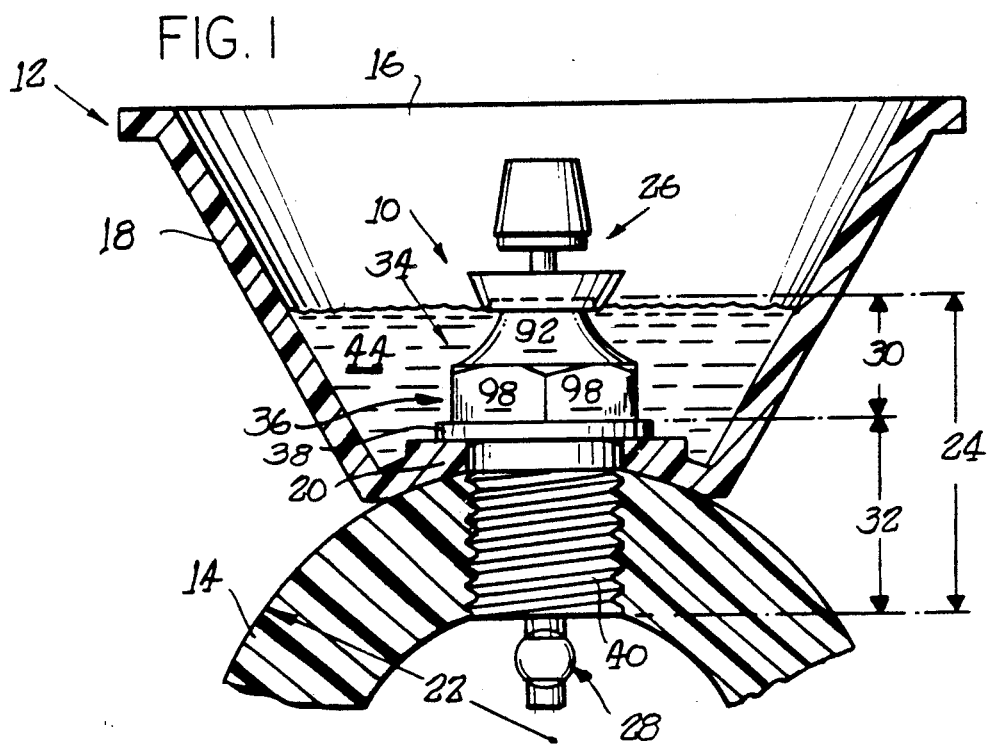
FIG. 1 is a partial fragmentary side sectional view of a valve disposed within a container and threadedly attached to a source manifold.

While this invention may be susceptible to embodiment in different forms, there is shown in the drawings and will be herein described in detail, a specific embodiment with the understanding that the present disclosure is to be considered an exemplification of the principles of the invention, and is not intended to limit the invention to the embodiment illustrated.

FIG. 1 provides an illustration of valve means 10 mounted within a dispensing container or cup 12 and threadedly attached to a supply manifold 14. The supply manifold 14 transports water throughout an animal watering system to provide a continuous supply of fresh water for the animals to drink. The cup 12 is formed for retaining a volume of water having an open top end 16 and is generally downwardly conically shaped having sloped walls 18 and a base 20. It is desirable to form the base 20 to compliment the outside diameter 22 of the supply manifold 14 to prevent the animals drinking from the cup from rotating the cup 12 and possibly damaging it.

The valve includes a valve body 24, regulating means 26 and check valve means 28. The regulating means 26 and check valve means 28 will be described in greater detail in describing FIG. 3 below. As illustrated in FIG. 1, the valve body 24 has an upper portion 30 and a lower portion 32. The upper portion 30 is made up of a conical dome 34 and a polygonal base 36 mounted below the conical dome 34. The lower portion 32 is made up of a valve body flange 38 and a threaded portion 40.

Figure 2:
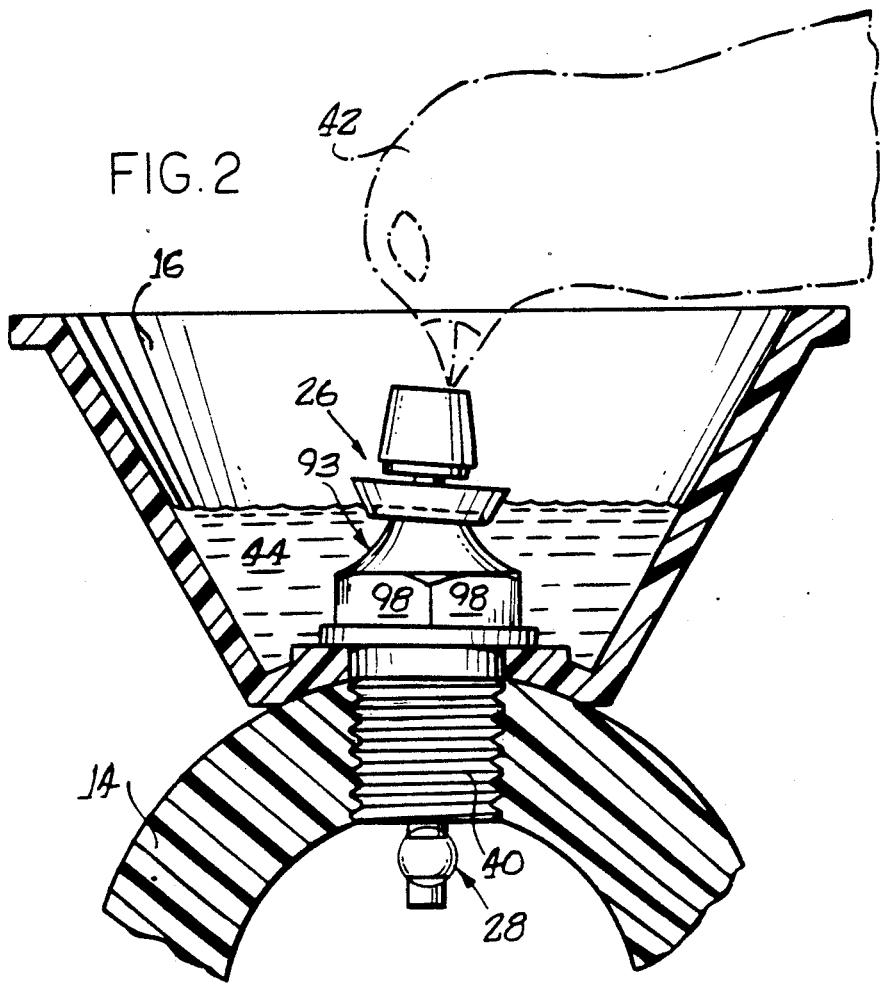
FIG. 2 is a partial fragmentary side sectional view of a valve disposed within a cup and threadedly attached

As illustrated in FIG. 2, animals such as chickens insert their head 42 into the open end 16 of the cup 12 to drink from the water 44 disposed within the cup 12. As animals insert their head 42 to drink the water 44, they either bump the regulating means 26 with their head or develop a learned response to push the regulating means 26 to release water to fill the cup 12.

In a variety of ways, feed and other particulate matter fall into the cup 12 and generally settle to the bottom of the cup 12 producing a sedimentation build-up therein. Some particulate matter which falls into the cup 12 may float and will be consumed by animals drinking from the cup without harm to the animals. Generally, the cup 12 is dimensioned to hold a sufficiently large volume of water to satisfy the animals drinking therefrom while providing a volume which is small enough to assure continuous replenishment of the entire volume disposed within the cup 12.

Figure 3:
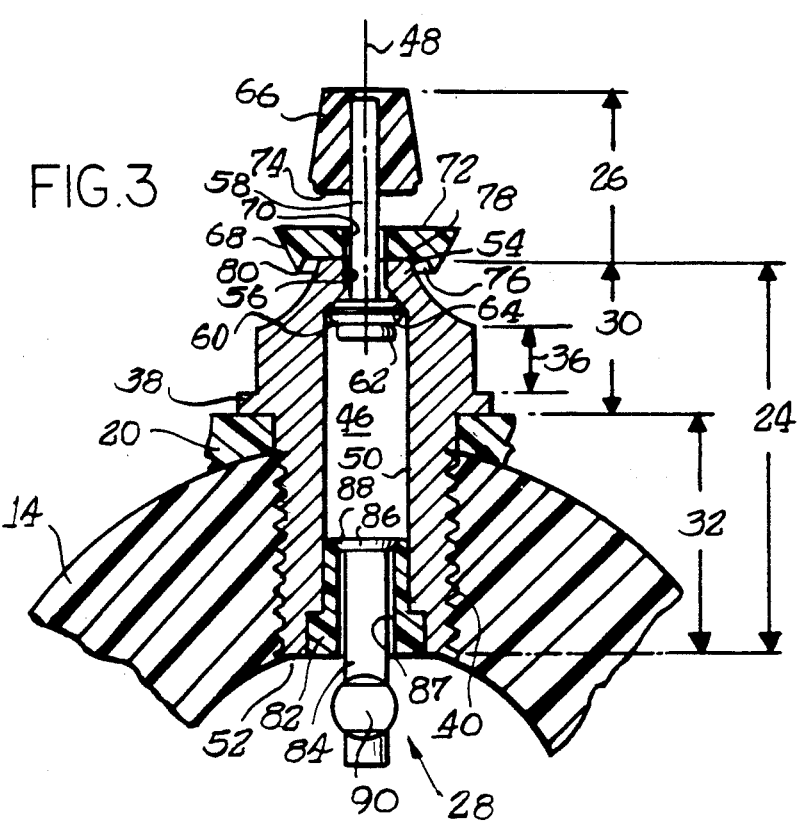
FIG. 3 is an enlarged partial fragmentary sectionalized view of the valve.

FIG. 3 provides a detailed enlarged partial sectional view of the valve 10. As shown, the valve body 24 is formed with a chamber 46 generally concentric with a primary axis 48 extending through the upper portion 30 and the lower portion 32. Extending from an inlet port 50 formed in a source end 52 of the lower portion 32 upwardly towards a discharge end 54 through which is formed an upwardly directed discharge opening or port 56, the chamber 46 and the ports 50, 56 permit water to flow from the supply manifold 14 through the inlet port 50, the chamber 46, the discharge port 56 and into the cup 12.

Regulating means 26 are positioned on top of the discharge end 54 and extends through the discharge port 56 into the chamber 46. A valve shaft 58 projects downwardly into the chamber 46 with an O-ring valve seal 60 therearound retained by an O-ring retaining flange 62. The O-ring 60 seats between a valve seat 64 and the O-ring flange 62 under force of positive water pressure maintained within the chamber 46. Projecting upwardly through the discharge port 56, the top-most end of the shaft 58 terminates in a head 66 attached thereto. Intermediate the head 66 and the discharge port 56 is a deflector baffle 68.

The deflector 68 is generally a disc-shaped member with a bore 70 formed through the center. The valve shaft 58 projects through the bore 70 and permits axial movement of the deflector 68 along the primary axis 48 of the valve shaft 58. Movement of the deflector 68 is limited in an upward direction when a top surface 72 of the deflector 68 contacts a bottom surface 74 of the head 66. Downward movement is limited when a bottom surface 76 of the deflector 68 contacts a top surface 78 of the discharge end 54. As will be detailed further hereinbelow, the underside of the deflector 68 is formed with a downwardly disposed peripheral rim 80 which helps to deflect water downwardly towards the bottom of the cup 12.

Check valve means 28 are disposed in the source end 52 of the chamber 46. A check pin retainer 82 is securely positioned within the inlet port 50 to retain a check pin 84 which seals a check valve port 87 against backflow water pressure through the chamber 46. Towards the top end of the check pin 84 an upwardly flared pin head 86 is formed to fit into a retainer seat 88 formed in a corresponding portion of the check pin retainer 82. At the other end of the check pin 84, distal the pin head 86, the check pin 84 projects into the supply manifold 14 and has a flattened crimped area 90 formed thereon to limit the range of movement of the check pin 84 in the chamber 46.

Figure 4:
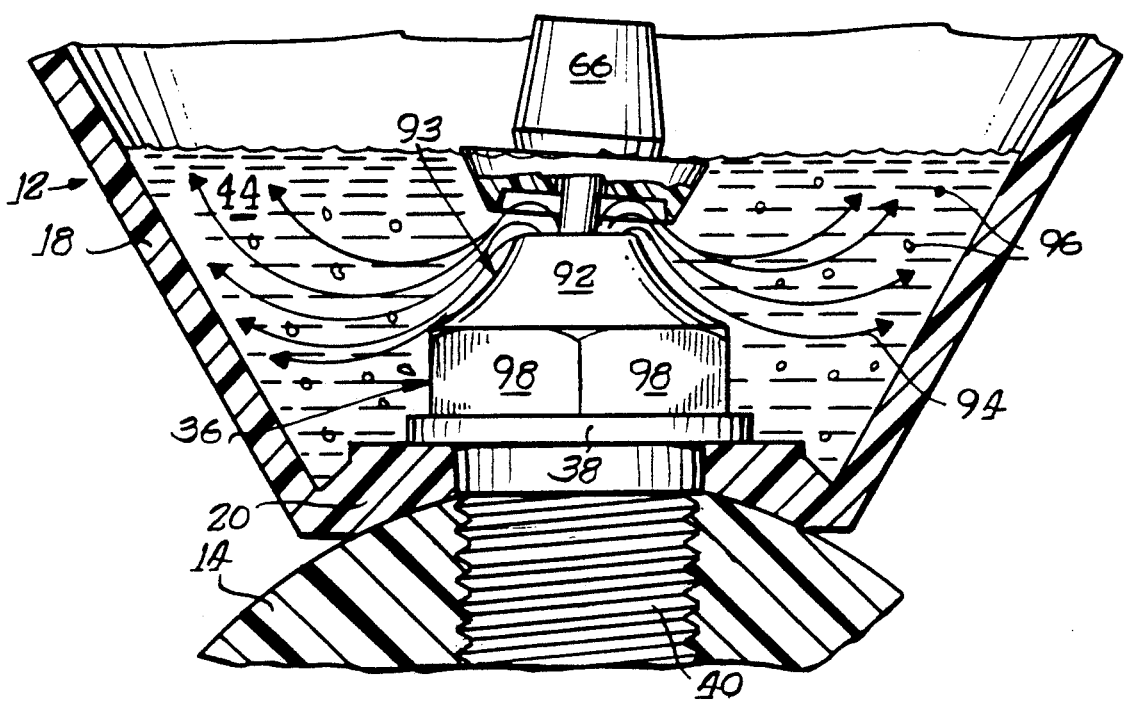
FIG. 4 is an enlarged fragmentary partial sectional side view of an activated valve illustrating the enhanced agitating flow pattern created by the flow directing portion of the upper valve body.

When in use, the O-ring 60 attached to the shaft 58 is unseated from the valve seat 64 when the head 66 attached to the valve shaft 58 is forceably displaced. Positive flow force of the water in the chamber 46 forces water through the opening created between the unseated O-ring 60 and the valve seat 64 forcing water up through the discharge port 56. As shown in FIG. 4, when water is discharged through the discharge port 56, the pressure of the water raises the deflector 68 axially upwardly along the valve shaft 58 towards the head 66. When the deflector 68 is limited by the head 66, the water surging against the bottom side 76 of the deflector 68 is forced downwardly onto flow directing means 92 formed on the generally conical valve dome 34. Water surging against the bottom surface 76 of the deflector 68 is directed downwardly and prohibited from flowing outwardly by the downwardly disposed peripheral rim 80 which generally forces the water opposite the direction from which it is discharged from the discharge port 56.

As illustrated in FIG. 4, the flow directing means 92 comprise the outside surface of the generally conical valve dome 34 with a concave annular surface 93 which directs the water forced downwardly by the deflector 68. Water which travels along the concave conical surface 93 of the directing means 92 creates an agitating flow pattern in the water 44 disposed within the cup 12 as illustrated by arrows 94. The agitating flow pattern 94 lifts sedimentation and particle matter 96 from the bottom of the cup 12 to at least temporarily suspend the sedimentation and particles 96 for consumption by animals drinking from the cup 12. This agitating action even lifts and forces sedimentation out of areas which would be blind spots or otherwise out of reach and unaffected by prior art designs. Further, the conical shape of the dome valve 34 prevents the build up of particulate matter on the upper portion 30 of the valve 10.

It is conceivable that a variety of flow directing means 92 surfaces can be formed to achieve a desired agitating flow pattern depending upon such factors as cup shape and dimensions, flow rate, and type of sedimentation. The concave annular surface 93 formed on the generally conical valve dome 34 is intended to illustrate one form of the flow directing means of which other forms may be devised. It should be clear, upon review of FIG. 4, that the flow patterns created and enhanced by the flow directing means 92 are capable of suspending essentially all sedimentation deposited within the cup for consumptive elimination by animals drinking therefrom and thereby essentially obviating the need for periodic cup cleanings. Further, the conical dome valve 34 prevents accumulation of valve fouling particulate matter on the valve 10.

Integrally formed with the valve body 24, the polygonal base portion 36 formed on the upper portion 30 and the threaded portion 40 formed on the lower portion 32 permits the valve 10 to be threadedly engaged with and securely retained on the supply manifold 14. The polygonal base portion 36 is formed with surfaces 98 for engaging a complimentary tool to facilitate rotationally attaching the threaded portion 40 to the supply manifold 14. The valve body flange 38 securely retains the cup 12 by the base portion 20 in secure engagement on top of the supply manifold 14 when the valve 10 is threadedly attached thereto.

While a preferred embodiment of the present invention is shown and described, it is envisioned that those skilled in the art may devise various modifications of the present invention without departing from the spirit and scope of the appended claims.

The invention is claimed as follows:

1. A watering assembly for poultry and the like comprising a dispensing container for retaining a volume of water, means for supplying water into said container including a body portion projecting into said container and presenting an upwardly directed water discharge opening, valve means for controlling flow of water through said opening a primary axis longitudinally extending through said valve means and said body portion, a freely axially movable deflector disposed in alignment with and movably covering said discharge opening for deflecting water flowing through said discharge opening back toward said body portion when water flows through said discharge opening, said deflector substantially covering and projecting laterally of a top surface of said body portion throughwhich said discharge opening extends when flow therethrough ceases, and flow directing means formed on an uppermost portion of said body portion surrounding said discharge surface for directing deflected water for creating agitating flow patterns within said container and displacing any sedimentation or food particles and the like which may have accumulated within the container.

2. A watering assembly according to claim 1, wherein said body includes an upper portion and a lower portion, said upper portion of said body including said flow directing means being generally conically dome-shaped for preventing particulate matter accumulation on said body portion and for directing water deflected by said deflector generally downwardly towards the bottom of said container for creating agitating flow patterns.

3. A watering assembly according to claim 2, wherein said flow directing means is additionally generally annularly concave on an outside surface thereof.

4. A watering assembly according to claim 2, wherein said deflector means further includes a downwardly disposed peripheral rim formed on a discharge opening side of said deflector for focusing water flow discharged from said body towards said flow directing means.

5. A watering assembly for poultry and the like comprising a dispensing container for retaining a volume of water, means for supplying water into said container including a body portion projecting into said container, an upwardly directed water discharge opening formed through a top end of said body portion, valve means for controlling flow of water through said opening, a primary axis longitudinally extending through said discharge opening and said valve means, a freely axially movable deflector disposed in alignment with said opening for deflecting water flowing through said discharge opening back toward body portion, a top end of said body portion being formed with an annularly concave and conically dome-shaped outer surface for preventing sedimentation and particulate matter from accumulating thereon, said discharge opening being formed through a top surface of said top end of said body portion for preventing particulate matter from accumulating thereon.

6. A watering assembly according to claim 5 wherein a top end of said body portion has a first dimension measured across a diameter and being formed with a discharge opening therethrough, said discharge opening being of a second dimension, said first and second dimensions being substantially similar for reducing the surface area of said top end of said body portion for preventing the accumulation of particulate matter thereon.

7. A watering assembly for poultry and the like in combination with a water supply system for dispensing water into a watering assembly including a container and a valve and agitating the contents of the container to prevent fouling of said valve and sedimentation accumulation in the container, said water supply system includes a supply manifold through which water is transported to said valve and to which said valve is operatively attached, an open-ended container in which said valve is disposed for retaining water dispensed from said valve, said valve projecting at least partially through one side of said container for dispensing water therein, said valve comprising: a body; a source end of said body being attached to said supply manifold and a discharge end of said body disposed within said container; said body including an upwardly directed water discharge opening projecting through an uppermost surface of said discharge end for permitting water to flow from said valve to said container, a primary axis extending longitudinally through said body; a freely axially movable deflector means for directing water flow released through said water discharge opening downwardly towards a bottom of said container, said deflector means overlying and extending beyond an uppermost surface of said discharge end; said body including flow directing means formed on the uppermost surface of said discharge end for controllably directing water flow deflected by said deflector means and creating agitating flow patterns within water disposed in the container for mixing and suspending sedimentation and particles in the water to prevent accumulation in the container and on the body of said valve.

8. A watering assembly according to claim 7, wherein said body has an upper portion and a lower portion and said flow directing means is formed on said upper portion of said body, said flow directing means being generally conically dome-shaped for directing water deflected by said deflector means generally downwardly towards the bottom of said container to create agitating flow patterns.

9. A watering assembly according to claim 8, wherein said generally conically dome-shaped flow directing means is a generally annularly concave surface.

* * * * *